United States Patent Office 3,555,646
Patented Jan. 19, 1971

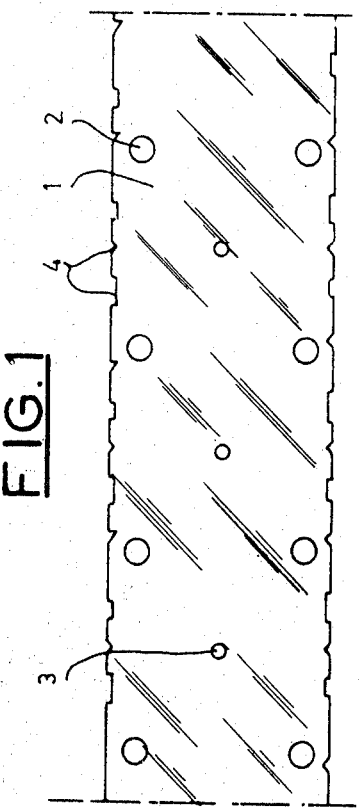
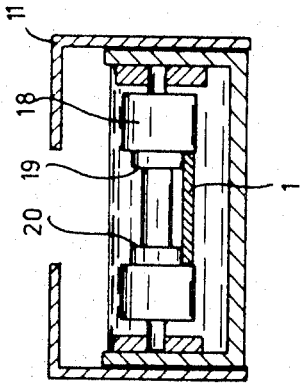
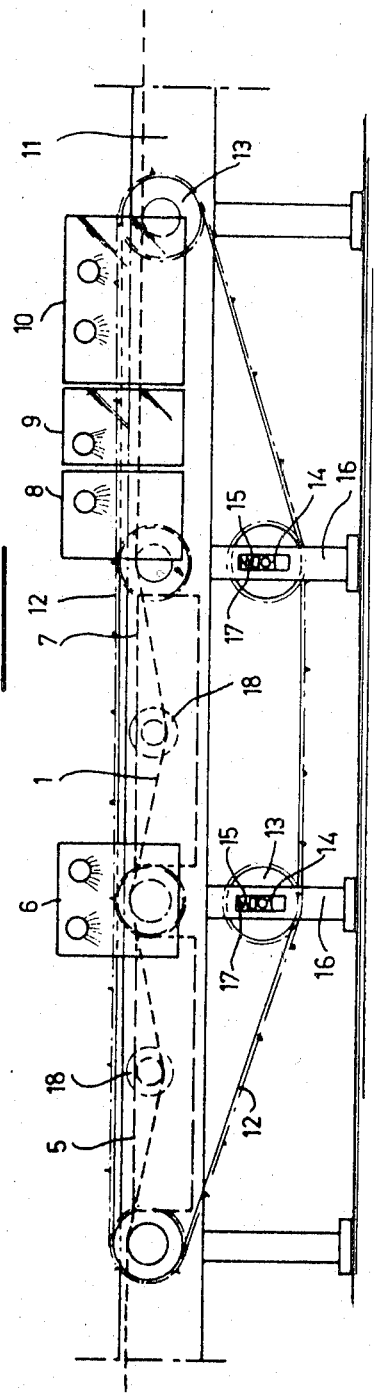

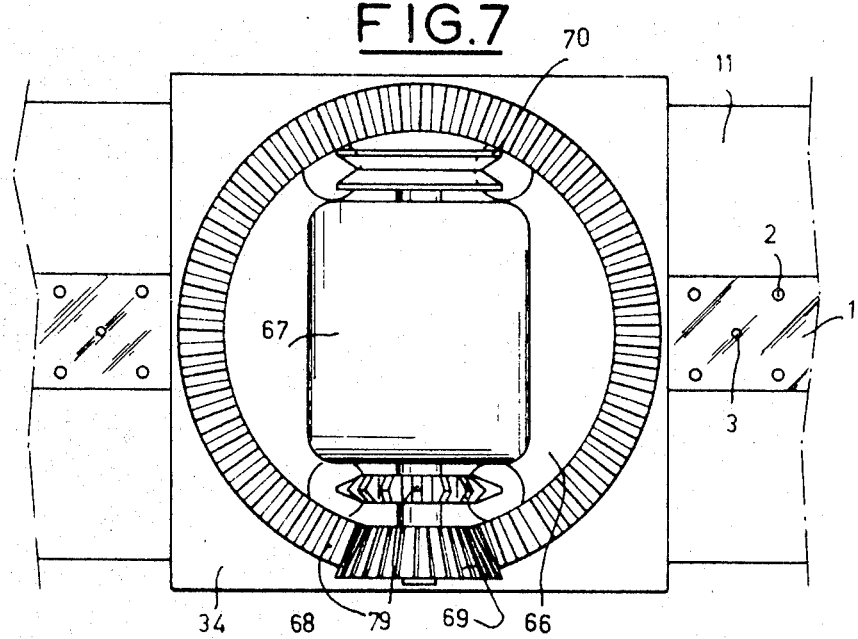
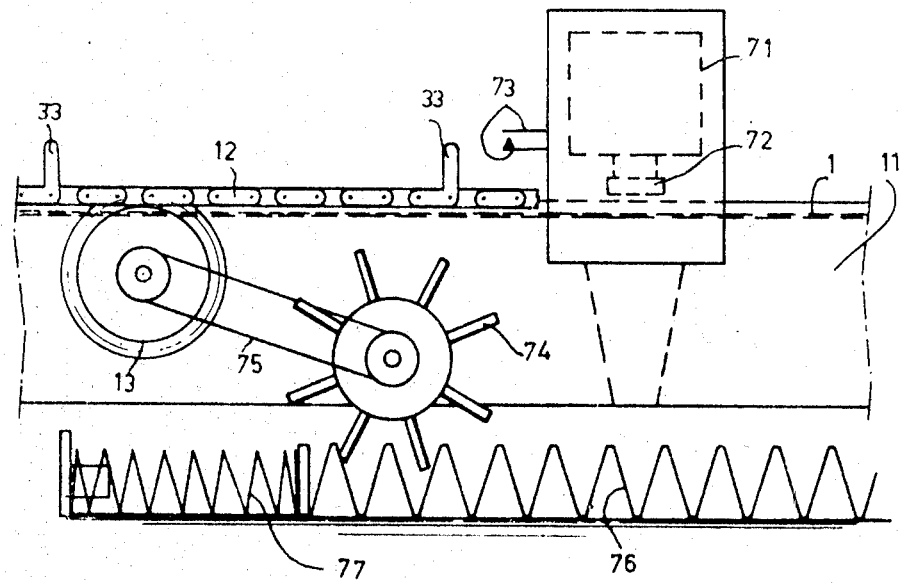

3,555,646
PROCESS FOR MANUFACTURING TIMEPIECE DIALS IN SERIES
Roger Uebelhardt, Bienne, Switzerland, assignor to Cadral S.A., Bienne, Switzerland, a company of Switzerland
Filed Feb. 9, 1968, Ser. No. 704,448
Claims priority, application Switzerland, Feb. 13, 1967, 2,151/67
Int. Cl. B23p 13/00
U.S. Cl. 29—177
10 Claims

ABSTRACT OF THE DISCLOSURE

Timepiece dials are formed from a strip of material which is advanced step-by-step in a lengthwise direction through a sequence of operating stations at each of which an operation is performed in the production of the dials. The dials are then successively cut from the strip and positioned in a packing container.

---

The present invention has for object a process for manufacturing timepiece dials as well as an installation for carrying out this process.

The manufacture of timepiece dials requires numerous operations necessitating actually long manipulations which increase considerably manufacturing costs.

It has already been proposed to standardize this manufacture by various means. One of these consists in using fittings having a rectilinear groove in which are introduced the feet of the dials by means of which they are positioned in view of various operations. These fittings permit to group series of dials which are machined at the same time during operations of brushing for example.

A manufacturing process recommends making the blank of the dial by stamping a metallic side in order to give it the shape of the back of the dial. There is provided in the peripheral part of the blank dial located outside the zone forming the dial once the same is finished, indexing means serving to position the blank dial during later operations in its manufacture and the face of the dial is machined by removing material with the aid of a cutting tool.

Such a process does not eliminate manipulation and necessitates additionally the use of metallic flanks which are considerably thicker than the plate of the finished dial, occasioning a considerable percentage of rejects.

It has also been thought previously to machine parts in a strip passing in front of work stations.

Several difficulties have opposed themselves heretofore to the acceptance of these processes for manufacturing dials. One of these difficulties resides in the fact that the large number of operations carried out on the dial as well as the variety of these operations in going from one type of dial to the other renders difficult the command of the work post. In effect in the manufacturing processes using installations for machining on a strip, the operations of the machine are well defined and this machine is studied with a view of producing only articles which are strictly identical. The duration, the number as well as the sequence of the operations are not changeable which permits to command the installation by a system of cam shafts.

The manufacture of dials on the contrary poses a completely different problem. In effect there are known several types of dials which can be classified into four principal groups, dials with transferred indicia, dials with embossed indicia, dials with milled indicia and dials with indicia set in sockets. In each of these four groups, the decoration of the face of the dial as well as that of the indicia varies considerably according to the appearance that it is desired to give to the dial. Moreover, the number of the indicia is not always the same. This is the reason why such an installation must be readily adaptable to the type of dial to be made. This installation must be transformable at will according to the number, the duration and the sequence of the operations necessary, while permitting to obtain their synchronization.

The present invention has for its object a process for manufacturing timepiece dials in series in which each dial is cut from a strip, characterized by the fact that at least a part of the operations on the front of the dials are made on one side of said strip before these are separated therefrom.

This invention also has for its purpose an installation for carrying out this process comprising a frame on which are placed different work stations, means for stepwisely driving the strip and means for triggering the operations and positioning the strip, characterized by a control member with adjustable time intervals connected to said driving means, these means being systematically fast on means for triggering the operations, at least a part of the work posts comprising members for controlling the stop of the operations, the positioning and the gripping of the band.

The accompanying drawings represent by way of example one modification of the present invention.

FIG. 1 shows a strip on which are carried out the operations.

FIG. 2 shows a schematic side view of a part of the installation.

FIG. 3 is a cross section taken along line III—III of FIG. 2.

FIG. 7 is an underneath view of a second machine.

FIG. 8 is a side view of a passing device.

Figure 4:
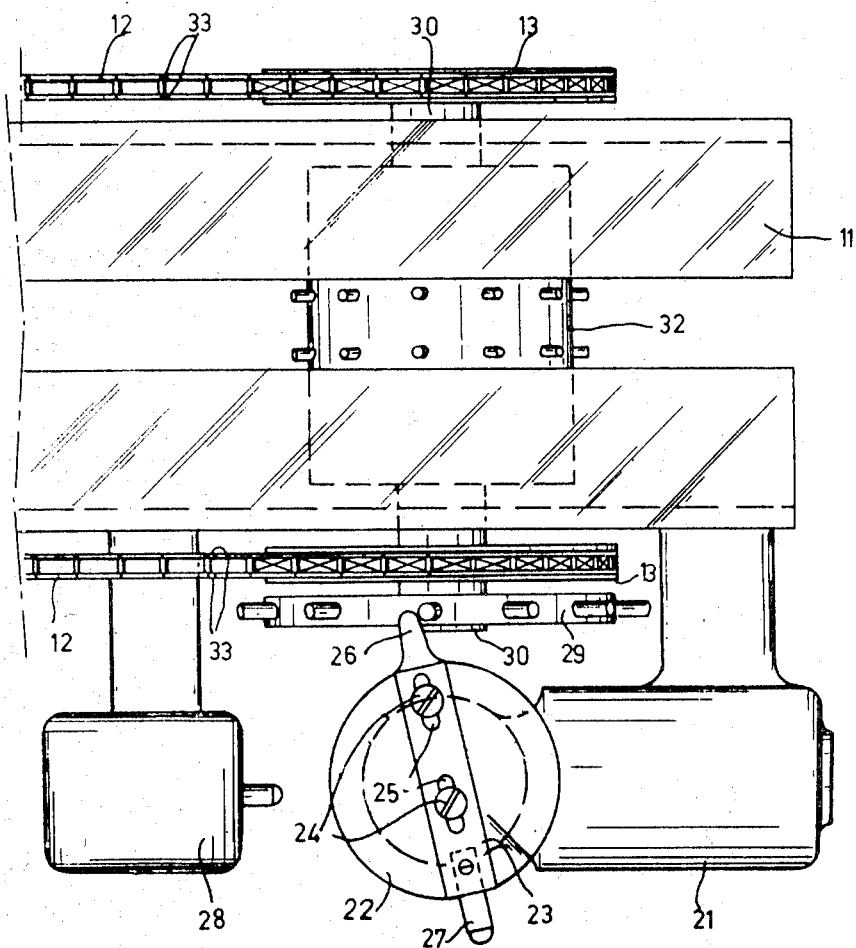
FIG. 4 is a detailed view of the driving means.

FIG. 1 shows a band or strip 1 on one face of which is carried out the operation affecting the front of the dial. This strip has openings 2 intended to cooperate with driving means and means which will be later described. Openings 3 define the centre of the dials and can additionally serve for centring and adjusting the position of the tool above the strip. The edges of the strip are cut out by nicks 4 intended to cooperate with an automatic press for cutting out holes 2 and 3 in such a way that these holes be strictly equidistant and additionally can serve later for the control of one or several working positions.

The installation shown schematically in FIG. 2 illustrates the machine in phase corresponding to the coating of the strip and comprises a washing bath 5, a drying post 6, a galvanic vat 7, a brushing station 8, a post for coating with a cellulosic varnish 9 and a drying station 10.

These different stations are secured to frame 11. An endless chain 12 for controlling operations and which will be described in greater detail later on is guided and driven by toothed wheels 13. This chain is tensioned by two of wheels 13 pivoted in bearings 14 slidingly mounted in elongated openings 15 provided in pillars 16 supporting frame 11. These sliding bearings 14 are stressed by springs 17 causing constant tension of the endless chain 12.

Band 1 is guided by rollers 18 which are intended to make it pass in wash bath 5 and then to make it come out of the vat for drying in order to make it penetrate later in the galvanic bath. One of these rollers 18 shown in FIG. 3 comprises a first shoulder 19 serving for laterally guiding the band and a second shoulder 20 intended to avoid contact of the central part of the band in which will be cut out the dial with the roller. The second shoulder can also serve for the passage of the feet of the dial when the band passes on the roller and is already provided with said feet.

The device for advancing the band and controlling the operations shown in FIG. 4 comprises a motor 21 actuated by a reducing gear, not shown, a driving wheel 22 provided with a slider 23 secured by screws 24 cooperating with elongated openings 25. This slider comprises at its extremity a fixed finger 26 and on the other hand an adjustable finger 27. These fingers cooperate alternately with an adjustable timed switch 28 for controlling motor 21 and with a toothed wheel 29. This wheel is fast of a shaft 30 pivoted at 3 and 11 and to which are secured two toothed wheels 13 and a pivoting drum 32. Wheels 13 mesh with chains 12 placed on each side of the frame and the pivoting drum 32 meshes with holes 2 of strip 1 with a view to driving it. Each chain 12 has a series of fingers 33 equidistant one from the other and intended for triggering operations as will be described in greater detail later on.

The principle of command of the facetting machine shown in FIGS. 5 and 6 and which will be described later can be used for other work stations with the exception of the washing station and the station for galvanically coating which do not comprise switches and which are continuously under tension. The system for positioning and tightening the strip described for this machine is used only when this operation must be carried out at a very precise place in the band such as the facetting of hour signs.

Figure 5:
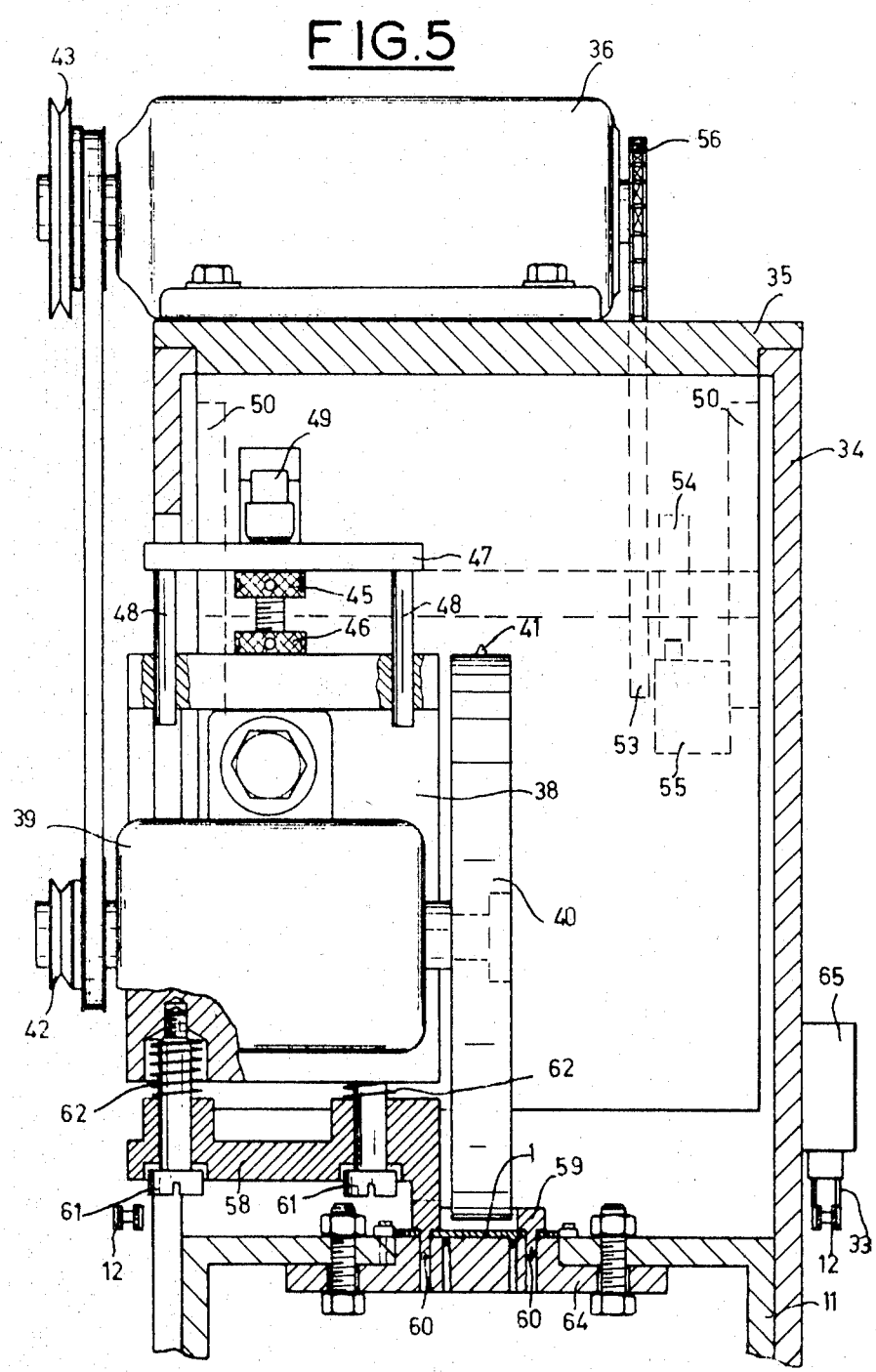
FIG. 5 is a transversal cross section of the frame on which is secured the machine.
Figure 6:
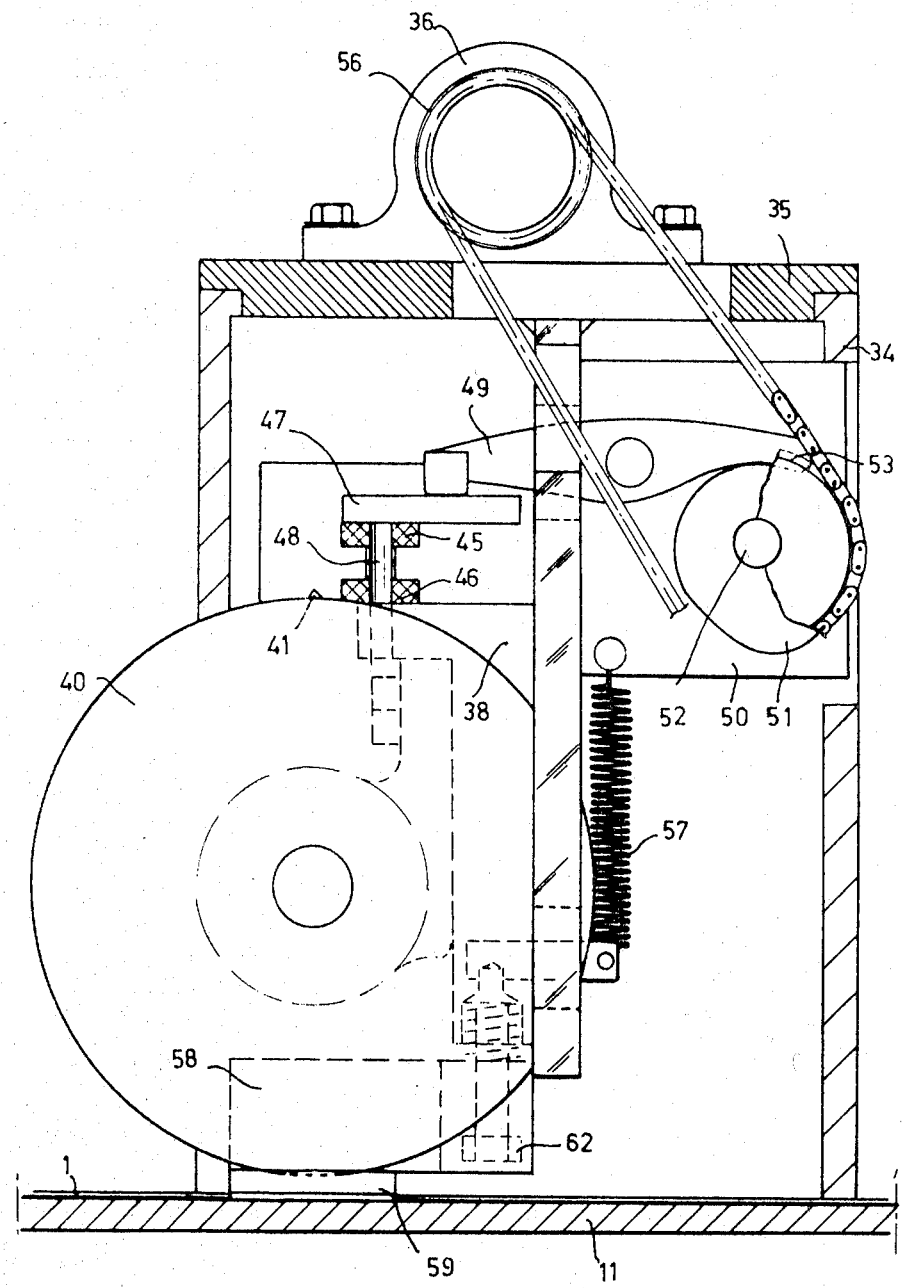
FIG. 6 is a side view of the machine on FIG. 5.

As shown in FIG. 5 and 6, the facetting machine comprises a frame 34 secured to frame 11. The entire machine is fast on a tray 35 rotatably mounted on frame 34. Frame 35 carries driving motor 36. A rectangular support 37 is secured perpendicular to tray 35. This support has a vertical guiding element whose cross section has a dove-tail on which is mounted a slide 38 carrying quill 39 on which is pivoted a shaft one of whose extremities is rigid with a fly-wheel 40 on the edge of which is set a diamond 41 and at the other extremity of which are secured driving pulleys 42 connected to pulleys 43 of motor 36 by a belt (not shown). The means for adjusting the penetration of the diamond in the strip comprise a screw 45 screwed in slide 38 and a blocking screw 46. The head of screw 45 bears against the movable element 47 rigid with two columns 48 movable axially in slide 38.

As shown in FIG. 6 the movable element 47 cooperates with the penetration lever 49 pivoted on the other side of support 37 on the plate 50 perpendicular to this face. This lever is actuated by a cam 51 fast of shaft 52 pivoted between two plates 50 and on which is secured a toothed driving wheel 53 and a second cam 54 cooperating with a contact 55. Wheel 53 is connected to pinion 56 of motor 36 by a chain in order to avoid sliding. A return spring 57 for a slide 38 is secured on the one hand to one of the plates 50 and on the other hand to an arm fast of slide 38 and passing through an opening made in support 37. This spring 37 pulls slide 38 upwardly applying constantly lever 49 against cam 51.

Slide 38 carries on its lower part means for gripping and positioning the strip constituted by a plate 58 fast of a frame 59 to which are secured conical pins 60. Plate 50 is mounted slidably on two guiding members 61 screwed in slide 38. Spring 62 presses plate 58 against the head of guides 61. Pins 60 cooperate with openings 63 of a template 64 fixed under the strip 1 to frame 11. Pins 60 and openings 63 are placed on either side of strip 1 facing centring holes 2 thereof, frame 59 being intended to grip this strip against template 64. It is evident that each frame as well as the relative positions of pins 60 thereon is different according to the angular position of tray 35 relative to strip 1, position dependent upon the marker made by diamond 41. If the frame interferes with the operation of the diamond, it is possible to skip for example a pair of holes 2 to work with the following pair.

In certain cases the frame can also be opened to permit passage of disc 40. As seen in FIG. 5 chains 12 pass on each side of frame 11. Frame 34 carries a switch 65 the removable part of which is placed in a trajectory of fingers 33 of chain 12.

On the facetting machine which has just been described can be adapted with some modifications, other tools such as the brush for radially brushing the dials.

Shown in FIG. 7, the support of the brush can be mounted on a disc 66 carrying a motor 67 and pivoted on the upper face of frame 34. A toothed crown 68 is then secured to frame 34 around tray 66. The motor is provided on the one hand with a toothed pinion 69 meshing with the crown 68 and on the other hand with a pulley 70 intended to drive the brush as described in the facetting machine. A second pinion 79 is intended to drive the cam shaft. A reducing gear train permits to drive pinions 69 and 79 at a speed which is less than that of pulley 70. In order to decrease friction, there can be mounted a disc 66 on the frame 34 through a crown of balls. As the machine is rotated, the positioning and tightening device must be eliminated from the band. It is evidently possible to replace it by a device secured to frame 34 but it is preferred to eliminate it. The pressure of the brush and the centring given by the driving drum 32 shown in FIG. 4 suffice, the pressing operation not requiring a precision as great as that of facetting.

FIG. 8 shows a modification of a device for automatically extracting and packing dials which comprises an electro-magnet 71 secured above band 1. This electro-magnet is covered at its extremity by a bumper 72 of plastic material for example in order not to damage the obverse of the finished dial. A contact cooperates with fingers 32 and chain 12. A pallet wheel 74 is driven stepwise by a belt 75 connected to a toothed wheel 13 meshing with chain 12. The pallets of wheel 74 cooperate with a packing box 76 folded in accordion to form successive parallel housings. An extremity of this carton bears against the free end of a spring 77 compressed by the advance of carton 76 controlled by the pallets of wheel 74. This wheel drives successively parallel housings in front of a funnel 78 guiding the dials which have come out of the strip by the bumper of electro-magnet 72 actuated by the closing of contacts 73.

The operation of the installation is the following. Strip 1 is introduced after having been first provided with centring holes 2 up to the driving drum 32 on the pins of which the band is hooked by its holes 2. Drum 32 is placed on the frame 11 at the opposite end from that where the band is introduced. Once the band is hooked on drum 32, machining can begin. The start of motor 21 causes the rotation of wheel 22 and of slider 23 whose finger 26 drives by one step wheel 29. This wheel 29 turns until finger 27 meets the timed switch 28 which stops motor 21. The duration of stopping of the motor is selected in function of the work post necessitating the longer time of operation. The length of movement of the band at each step of wheel 29 is selected in function of the distance separating two holes of centre 3 of band 1. Once the time has lapsed, the motor starts again and it is finger 27 this time which drives wheel 29 and finger 26 which actuates switch 28.

While turning wheel 29 drives in addition to the drum 32 the two toothed wheels 13 actuating chain 12.

As seen in FIG. 5 for example the passage of each finger 33 of chain 12 causes the actuation of switch 65 which starts motor 36 driving cam shaft 52. Cam 51 controls the descent of slider 38. Before bringing diamond 41 in contact with strip 1, slide 38 causes the gripping and the positioning of the band by means of frame 59 and pins 60 against template 64. When the diamond has done its work, the cam and the return spring 57 cause the ascent of slide 38 and loosens strip 1. The second cam 54 then actuates switch 55 which stops the motor.

The operation of the stop and start of the motor described for the facetting machine applies for all the work stations operating temporarily. The duration of operation of the cellulose varnish spray guns is controlled in the same manner. Thus each machine is autonomous, only its start being synchronized by the fingers 33 of chain 12. This is very important in the making of dials as it permits a rapid transformation of the installation. A facetting machine thus machining a given indicia, it is necessary to use as many machines as there are indicia or if there is realized a series of dials having twelve indicia, then another series having four indicia only, it is possible to eliminate eight facetting machines. To this effect it has been provided to use two or three frames 11 for carrying the different machining posts, a certain distance being allowed between each frame, distance along which strip 1 is slack. Each frame 11 is provided at its extremity with an independent driving system identical with that shown in FIG. 4. According to the number of operations to be made on a dial the number of units constituted by frames 11 can be reduced.

The installation described can be used also for dials with recessed signs, dials with milled signs in the thickness of the plate as well as for dials with indicia in relief.

For the latter dials, the problem has been solved by using the process of fabrication and the machine described in Swiss patent application No. 16,397/66. In effect, the making of dials with indicia in relief according to the processes and the machines actually used excludes all possibility of manufacturing in strips dials with signs in relief.

For the galvanic coating of the dials, the length of the vats determines the time of passage of the strip which is necessary for coating. The same is true for drying.

The device for extracting and packing of FIG. 8 is preceded by a cut out press which puts the dial back in the strip and which is then extracted by electro-magnet 71.

What is claimed is:

1. In a process of manufacturing timepiece dials, the steps of providing a continuous strip of dial material with longitudinally spaced holes, periodically advancing said strip in a lengthwise direction and a step-by-step manner through a sequence of work stations, said strip being moved a predetermined distance in each step, performing an operation on said strip at each of said stations successively to provide a series of timepiece dials on said strip, timing the initiation of at least certain of said operations by the movement of said strip, and further advancing said strip to a severing station at which at least partially finished dials are severed from said strip.

2. A process according to claim 1, which further comprises moving a control chain synchronously with said strip and timing the initiation of said certain operations by said control chain.

3. A process according to claim 1, in which said operations include the operation of facetting each dial face in succession at one of said stations.

4. A process according to claim 1, in which said operations include successively cleaning said strip, drying said strip, coating said strip with a non-metallic coating and drying said coating at successive ones of said stations.

5. A process according to claim 1, in which said holes provided in said strip include driving holes and a center hole for each of the dials.

6. A process according to claim 1, in which said operations include the brushing of said dials while in said strip.

7. A process according to claim 1, in which said dials after being severed from said strip are retained in place in said strip and are thereafter removed from the strip.

8. A process according to claim 1 further including the step of successively positioning said severed dials in a packing having recesses to receive them.

9. A process according to claim 1, in which said dials are provided with indicia in relief.

10. A process according to claim 1, including the steps of tensioning and accurately positioning said strip at selected operating stations.

References Cited

UNITED STATES PATENTS

| 2,022,263 | 11/1935 | Whitehead | 29—179 |
| 3,178,198 | 3/1965 | Rulf | 29—416 |
| 2,378,041 | 6/1945 | Sebell | 29—415 |
| 2,234,195 | 3/1941 | Preis | 29—415 |

JOHN F. CAMPBELL, Primary Examiner

R. J. CRAIG, Assistant Examiner

U.S. Cl. X.R.

29—178, 415, 557; 58—126